(12) United States Patent
Daas et al.

(10) Patent No.: US 10,058,040 B2
(45) Date of Patent: Aug. 28, 2018

(54) APPARATUS AND METHOD FOR GROWING ONE OR MORE PLANTS

(76) Inventors: Kamal Daas, Bergschenhoek (NL); Talal Daas, Naperville, IL (US); Peter Van Der Drift, Bleiswijk (NL)

( * ) Notice: Subject to any disclaimer, the term of this patent is extended or adjusted under 35 U.S.C. 154(b) by 0 days.

(21) Appl. No.: 13/388,571

(22) PCT Filed: Oct. 29, 2010

(86) PCT No.: PCT/EP2010/006626
§ 371 (c)(1),
(2), (4) Date: Feb. 2, 2012

(87) PCT Pub. No.: WO2012/034575
PCT Pub. Date: Mar. 22, 2012

(65) Prior Publication Data
US 2013/0160362 A1   Jun. 27, 2013

(30) Foreign Application Priority Data
Sep. 17, 2010 (DE) .................. 20 2010 012 739 U

(51) Int. Cl.
*A01G 9/02* (2018.01)
*A01G 31/02* (2006.01)
*A01G 9/14* (2006.01)

(52) U.S. Cl.
CPC .......... *A01G 9/1423* (2013.01); *A01G 9/028* (2013.01); *A01G 31/02* (2013.01); *Y02A 40/252* (2018.01); *Y02P 60/216* (2015.11)

(58) Field of Classification Search
CPC .......... A01G 31/02; A01G 9/02; A01G 31/00; A01G 31/06; A01G 27/005; A01G 2031/002; A01G 9/028

USPC ................ 47/59 R, 62 R, 62 C, 63, 65.8, 79
See application file for complete search history.

(56) References Cited

U.S. PATENT DOCUMENTS

| | | | |
|---|---|---|---|
| 1,491,926 A | 4/1924 | Rosenwald | |
| 1,815,195 A | 7/1931 | Favala | |
| 2,189,510 A | 2/1940 | Swaney | |
| 2,431,890 A * | 12/1947 | Raines | ........................ 47/62 A |

(Continued)

FOREIGN PATENT DOCUMENTS

| | | |
|---|---|---|
| CN | 2 323 582 Y | 6/1999 |
| EP | 86562 A1 | 8/1983 |

(Continued)

OTHER PUBLICATIONS

International Search Report correspondencing to International Application No. PCT/EP2010/006626, dated May 27, 2011; 5 pages.

(Continued)

*Primary Examiner* — Son T Nguyen
(74) *Attorney, Agent, or Firm* — Carter, DeLuca, Farrell & Schmidt, LLP

(57) ABSTRACT

The present invention relates to an apparatus for growing one or more plants, wherein the apparatus includes at least one first and one second chamber which are separated from each other by a first dividing wall, wherein the inner spaces of the first and the second chamber are connected by one or more connecting openings in the first dividing wall, and wherein the second chamber includes one or more exit openings which are arranged on a second dividing wall.

20 Claims, 12 Drawing Sheets

(56) References Cited

U.S. PATENT DOCUMENTS

| | | | |
|---|---|---|---|
| 2,463,719 A * | 3/1949 | Schackett | A01G 9/028 47/18 |
| 2,492,152 A | 12/1949 | Hollowell | |
| 3,766,684 A | 10/1973 | Kato | |
| 3,823,508 A | 7/1974 | Takehara | |
| 3,906,667 A | 9/1975 | Williams | |
| 4,009,862 A | 3/1977 | Defrees | |
| 4,034,506 A | 7/1977 | Kasahara et al. | |
| 4,035,950 A | 7/1977 | Anselm | |
| 4,254,791 A | 3/1981 | Bron | |
| 4,291,499 A * | 9/1981 | Prewer | 47/59 R |
| 4,310,990 A | 1/1982 | Payne | |
| 4,328,641 A | 5/1982 | Tesch | |
| 4,382,348 A | 5/1983 | Kitsu et al. | |
| 4,392,327 A * | 7/1983 | Sanders | 47/59 R |
| 4,669,217 A * | 6/1987 | Fraze | 47/64 |
| 4,860,490 A | 8/1989 | Morris et al. | |
| 4,926,584 A | 5/1990 | Horibata | |
| 5,010,686 A * | 4/1991 | Rivest | 47/62 C |
| 5,201,141 A | 4/1993 | Ahm | |
| 5,269,094 A * | 12/1993 | Wolverton et al. | 47/66.6 |
| 5,394,647 A * | 3/1995 | Blackford, Jr. | 47/62 A |
| 5,401,291 A | 3/1995 | Inoue | |
| 5,664,370 A | 9/1997 | Boudreau et al. | |
| 5,996,280 A * | 12/1999 | Michailiuk | 47/86 |
| 6,088,958 A * | 7/2000 | Oka et al. | 47/58.1 R |
| 6,216,390 B1 * | 4/2001 | Peregrin Gonzalez | 47/62 R |
| 6,219,966 B1 * | 4/2001 | Lapointe et al. | 47/62 C |
| 6,233,870 B1 * | 5/2001 | Horibata | 47/62 R |
| 6,247,269 B1 * | 6/2001 | Valiquette | A01G 31/02 47/81 |
| 6,332,287 B1 | 12/2001 | Geraldson | |
| 6,951,076 B2 * | 10/2005 | Winsbury | 47/62 R |
| 7,587,859 B2 * | 9/2009 | Bradley | 47/62 R |
| 7,818,917 B2 * | 10/2010 | Brusatore | 47/59 R |
| 8,887,439 B2 | 11/2014 | Daas et al. | |
| 2005/0241231 A1 * | 11/2005 | Bissonnette et al. | 47/81 |
| 2006/0156624 A1 | 7/2006 | Roy et al. | |
| 2009/0107043 A1 * | 4/2009 | Carney | A01G 31/02 47/62 R |
| 2012/0186151 A1 | 7/2012 | Daas et al. | |
| 2013/0160362 A1 | 6/2013 | Daas et al. | |

FOREIGN PATENT DOCUMENTS

| | | |
|---|---|---|
| EP | 937386 A1 | 8/1999 |
| EP | 2005817 A2 | 12/2008 |
| FR | 1 266 328 A | 7/1961 |
| WO | 92/13442 A1 | 8/1992 |
| WO | 95/11587 A1 | 5/1995 |
| WO | 98/14051 A1 | 4/1998 |
| WO | WO 01/62071 A1 | 8/2001 |

OTHER PUBLICATIONS

Writen Opinon of the International Search Authoirty corresponding to International Application No. PCT/EP2010/006626; 8 pages.

International Search Report corresponding to International Application No. PCT/EP2011/04697, dated Feb. 2, 2012; 4 total pages, including English translation.

English translation of Written Opinion of the International Searching Authority; dated Feb. 2, 2012; 6 pages.

English Translation of the International Preliminary Report on Patentability (Chapter I), dated May 8, 2013; 1 pages.

International Search Report corresponding to International Application No. PCT/EP2011/004698, completed on Jan. 31, 2012 and dated Feb. 2, 2012; 4 pages.

International Search Report corresponding to International Application No. PCT/EP2011/004699, completed on Jan. 2, 2012 and dated Jan. 24, 2012; 4 pages.

* cited by examiner

Figure 1d
Figure 1e
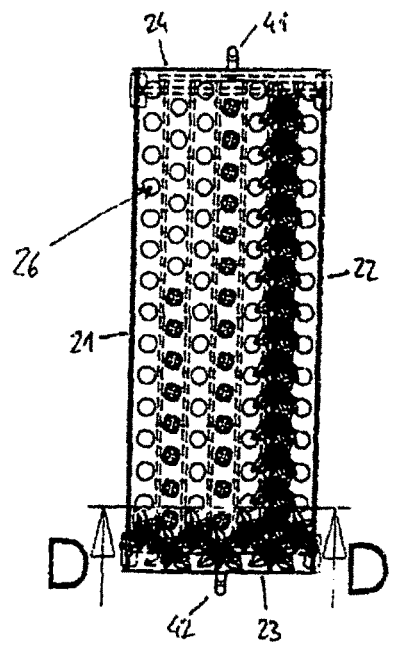
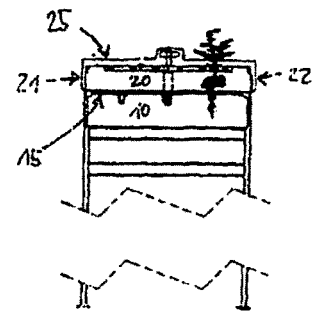
Figure 2
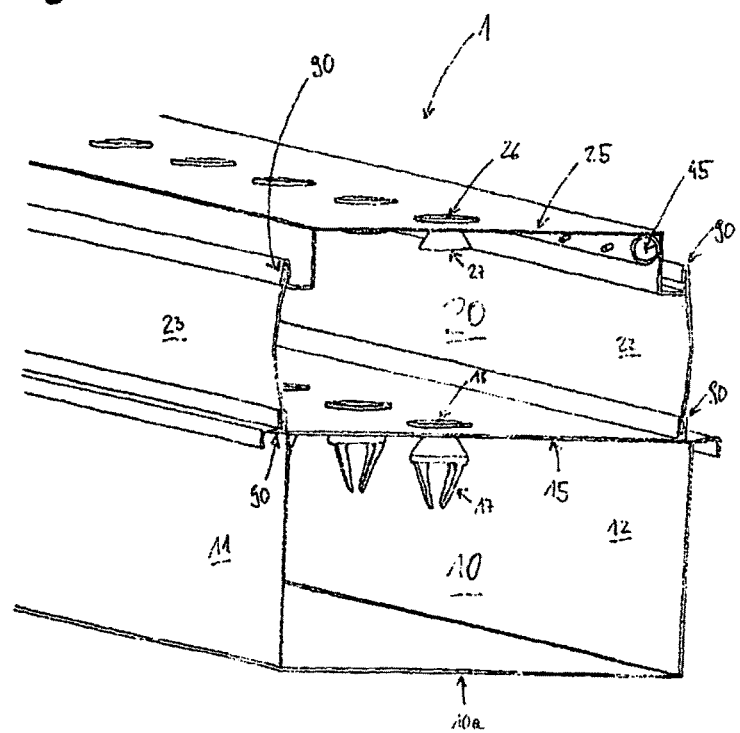

APPARATUS AND METHOD FOR GROWING ONE OR MORE PLANTS

This application claims priority to German Application No. 202010012739.4, filed Sep. 17, 2010 and PCT Application No. PCT/EP2010/006626, filed Oct. 29, 2010, the entireties of which are both hereby incorporated by reference.

This invention relates to an apparatus for growing one or more plants and to a method for growing one or more plants.

Apparatuses and methods for commercially growing plants are known in the prior art.

It is an objective of the invention to provide an apparatus which provides for an improved growing of plants and in particular crop-bearing useful plants.

In accordance with the invention, this objective is reached with an apparatus according to claims 1 and 12. Advantageous embodiments can be taken from the sub-claims.

Accordingly, the invention relates to an apparatus for growing one or more plants, wherein the apparatus includes at least one first and one second chamber which are separated from each other by a first dividing wall. The interior spaces of the first and the second chamber are connected by one or more connecting openings in the first dividing wall. The second chamber furthermore includes one or more exit openings which are arranged on a second dividing wall.

In a preferred embodiment, the second dividing wall is located opposite the first dividing wall. Preferably, the apparatus includes a plurality of connecting openings and a plurality of exit openings. Throughout the application, the terms "dividing wall" and "dividing plate" are used synonymous to each other. This should express that it preferably is a plate-shaped component. The connecting openings preferably serve for accommodating a region between root and crops, and the exit openings serve for accommodating a region between crops and leaf crown.

The apparatus according to the invention is suitable in particular for growing useful plants whose crops are located below the leaf canopy, such as potato, sweet potato, onion or truffle.

During the growth period, the first chamber substantially serves for accommodating the roots of the plants and the second chamber substantially serves for accommodating parts of the plant which comprise the crops. On the other side, i.e. above the second chamber, the leaf canopy of the plant should be located. The stem axis of the plant extends from the roots in the first chamber through a first connecting opening into the second chamber, passes through this second chamber and exits through an exit opening to the surface on the other side of the second chamber.

In one embodiment, the first and the second dividing wall are arranged substantially parallel to each other and preferably horizontally. The first dividing wall forms the lower boundary of the second chamber and the second dividing wall forms the upper boundary of the second chamber. The first chamber is arranged below the second chamber, wherein the first dividing wall forms the upper boundary of the first chamber. The second chamber substantially circumferentially, i.e. along the full circumference of the first and second dividing walls, is surrounded by lateral boundary walls which connect the first and the second dividing wall with each other. The distance between the first dividing wall and the second dividing wall subsequently is referred to as height of the second chamber.

In one embodiment, the first and/or the second dividing wall have four lateral edges, namely two opposed pairs of preferably parallel lateral edges. The lateral edges need not be straight, but can also be curved or in the extreme case continuously merge into each other. Preferably, the first and/or the second dividing wall is/are rectangular. The sides of the apparatus according to the invention formed by an opposed pair of lateral edges subsequently are referred to as front and rear sides of the apparatus. The direction of these lateral edges represents the width direction of the apparatus. The sides of the apparatus formed by the other opposed pair of lateral edges subsequently are referred to as left and right sides of the apparatus. The direction of these lateral edges represents the longitudinal direction of the apparatus.

In one embodiment, the first dividing wall and the second dividing wall substantially have the same dimensions.

In one embodiment, the front- and rear-side boundaries of the chambers, the left and right side walls of the first chamber, possibly the bottom plate of the first chamber and possibly the first and/or the second dividing wall form a stable frame.

In one embodiment, at least the second chamber and possibly also the first chamber is formed flat or channel-shaped. Explained preferably on the example of the second chamber, flat means that the height of the chamber maximally is half as long as the lengths both of the left and right lateral edges and of the front and rear lateral edges of the dividing walls. Explained preferably on the example of the second chamber, channel-shaped means that the height of the chamber maximally is half as long as the lengths of the front and rear lateral edges of the dividing walls. The lengths of the left and rear lateral edges of the dividing walls can, however, be similar to the height.

In one embodiment, the first chamber substantially is designed water-tight apart from the connecting openings in the first dividing wall.

In one embodiment, the first dividing wall floats on a nutrient medium or water, or lies on a substrate which is located in the first chamber at the position of one or more and/or lateral walls.

In one embodiment, the volume of the first and/or the second chamber is variable. This variation preferably can be effected by varying the distance between first and second dividing plate and/or by changing the position of the first and/or second dividing plate and/or by changing the position of one or more lateral walls, wherein the dividing plates form the upper and the lower boundary of the chamber. Preferably, the second dividing plate is moved, while the first dividing plate remains stationary. Within the scope of the invention it is, however, also conceivable that the first dividing plate is moved, while the second dividing plate remains stationary, or that both dividing plates are moved. The volume or the distance of the dividing plates can be adjustable in defined steps or steplessly.

In one embodiment, the variation of the volume of the second chamber can also be effected by the plant itself. During the growth of the plant or the crops, the second dividing plate can be lifted upwards and/or the first dividing wall can be pressed downwards.

By a stepwise or continuous variation of the volume of the second chamber, in which the crops are located, more space can be created for the crops with growing plants, and thus the yield can be optimized during the harvest.

In one embodiment, the distance of the first and the second dividing wall in one setting can be so small that the same rest against each other or that the second dividing wall is located only slightly above the first dividing wall. At the beginning of growth, this allows that a seedling which protrudes upwards through the connecting opening into the second chamber can immediately grow out through the exit opening.

The first dividing wall can be carried by a substrate or a solution present in the first chamber or lie on the same or be spaced from the same.

In one embodiment, a lifting and/or locking means is provided, by means of which the distance between the first and the second dividing plate can be varied and adjusted. This means preferably is located in the region of the front side and/or rear side of the apparatus according to the invention, and furthermore preferably on the front-side or rear-side side wall of the second chamber. There can be used electronic or hydraulic lifting mechanisms or simple hooks for fixing the dividing plates in various positions. Possibly, the apparatus according to the invention comprises a control means and/or a motor, which regulate the volume of the second chamber.

In one embodiment, at least one side wall of the second chamber, preferably the left and right side wall of the second chamber, and possibly all four side walls of the second chamber is/are formed flexible or elastic, at least on the connecting lines with the first and/or second dividing wall. In one embodiment, at least one side wall of the second chamber, preferably the left and right side wall of the second chamber, and possibly all four side walls of the second chamber is/are fabricated of rigid parts, which however are foldable or extensible.

In one embodiment, at least one side wall of the second chamber, preferably the front and rear side wall of the second chamber, and possibly all four side walls of the second chamber is/are formed rigid, wherein the first and/or second dividing wall is shiftably arranged along the respective side wall.

As a result, the second chamber always remains closed, although the volume is varied.

In one embodiment, the apparatus has the same number of connecting openings and exit openings. Thus, one connecting opening and one exit opening can be assigned to each plant.

In one embodiment, one pair of connecting openings and exit openings each is arranged in alignment with each other. This provides for a straight growth of the plant, wherein growth of the stem axis is started in vertical direction.

In one embodiment, means for fixing a plant part, preferably a seed, a seedling, a root tuber or the like, are present at the connecting openings or in the region of the connecting openings. The same possibly can protrude into the first and/or into the second chamber. Preferably, these means are arranged or attached on the lower side of the connecting opening and protrude into the first chamber. The same have the purpose that the respective plant part can be held in position below the connecting opening and that it is ensured that the stem axis grows through the connecting opening. Suitable means comprise a hook, a claw, a net, a grid, a support surface and the like. Often, these means also comprise a tube and/or a funnel which tapers from below towards the connecting opening.

In one embodiment, means for guiding a plant part are present at the exit openings, which possibly protrude into the second chamber and/or protrude from the surface of the second chamber. Preferably, these means are arranged or attached on the lower side of the exit opening and protrude into the second chamber. The same have the purpose that it is ensured that the stem axis grows through the exit opening. Suitable means comprise a funnel which tapers from below towards the exit opening.

At the beginning of the cultivation, this along with an initially small distance of the first and the second dividing wall promotes that a seedling which protrudes upwards through the connecting opening into the second chamber can immediately grow out through the exit opening.

In a further embodiment, the apparatus includes a third chamber. The second and the third chamber share the second dividing wall. The inner spaces of the second and the third chamber are connected with each other by the exit openings.

In one embodiment, the third chamber is arranged directly above the second chamber, wherein the second chamber spaces the first and the third chamber from each other. The apparatus according to the invention assumes a sandwich-like shape, wherein the first chamber lies at the bottom, the second chamber in the middle, and the third chamber at the top.

In one embodiment, the third chamber is formed voluminous, for example in the form of a bell, in order to offer enough space for the leaf canopy of the plant.

In one embodiment, the outer walls of the third chamber are at least partly fabricated of a transparent material. The outer walls comprise all boundary surfaces of the third chamber except for the second dividing wall, which preferably forms the bottom of the third chamber.

In one embodiment, the third chamber includes at least one illuminating means which illuminates the inner space of the third chamber or irradiates the inner space of the third chamber.

Thus, it is ensured that the leaf canopy of the plant receives enough light. In one embodiment, in which the apparatus according to the invention comprises three chambers, the apparatus according to the invention represents a kind of miniature greenhouse, wherein the entirety of the plant substantially is arranged within the three compartments and thus is climatically isolated from the surroundings.

In one embodiment it can be provided that the first and/or the second and/or the third chamber is divided into several compartments. This can be advantageous to render the spreading of bacteria or fungi from one plant to the next more difficult. In one embodiment it is provided that the first chamber is divided into compartments.

In a further embodiment it is provided that the second chamber is divided into compartments.

In one embodiment, all boundary surfaces of the first chamber are substantially rigid. This has the advantage of a high stability of the apparatus according to the invention. Furthermore, accommodating a humid substrate for the roots of the plants is facilitated. In the case of a hydroculture, water can also be retained more easily in a rigid first chamber.

In one embodiment, at least one outer surface of the first chamber is at least partly pivotable and/or shiftable and/or removable. Preferably, this is a wall located opposite the first dividing wall. This preferably is the bottom surface of the first chamber.

As a result, the roots of a consumed plant, substrate and water from the first chamber can simply be collected by placing a tray below the same and opening the boundary.

In another embodiment, at least a part of the outer surface of the first chamber is formed by a preferably water-tight sack or a plastic cap. The outer surface comprises all boundary surfaces of the first chamber except for the first dividing wall, which preferably forms the ceiling of the third chamber. The sack or the cap preferably are made of plastic material.

In one embodiment, the sack or the cap are removable or replaceable. Removal can be effected by releasing a suitable closure such as a zipper, a snap lock, a hook-and-loop fastener or the like.

In one embodiment, the sack or the cap is a sagging or bent component with a rectangular base area, which is fixed at a lateral edge along the entire length of the left side of the apparatus and at the opposite lateral edge is fixed along the entire length of the right side of the apparatus.

In one embodiment, the sack or the cap is shiftable or removable at the sides of the apparatus along the longitudinal direction of the component on a rail-like guide element. Suitable rail-like guide elements can sit on the left and right side walls of the first chamber or on the left and right lateral edges of the first dividing plate.

In one embodiment, the first and/or the second and/or the third chamber includes control means for adjusting the room climate. As required, all three chambers individually can include one or more humidification systems such as sprinklers or mist formers, and/or illuminating means such as lamps, and/or heating devices such as radiant heaters, heating coils or hot water conduits and/or cooling devices. As required, all three chambers individually can include one or more means for circulating water and/or air in a chamber or for the passage of water and/or air through a chamber. Such means for example comprise water pumps and/or air pumps and/or fans. Preferably, it is provided that in the second chamber means for adjusting the air humidity and the temperature are provided.

In one embodiment, the first and/or the second and/or the third chamber includes one or more means for determining the room climate. Suitable means comprise temperature sensors or an air humidity sensor.

In one embodiment, these means are controlled by a central control unit. This control unit preferably receives measurement quantities from measurement sensors in the chamber and correspondingly adjusts the control means, in order to achieve a target quantity.

Thus, a specific microclimate exists in each of the chambers. By a corresponding optimization of the climates, the growth of the plants and the crop yield can be optimized depending on the plant species.

In one embodiment, a device for spraying the respective chamber with water or a nutrient solution is located in the first and/or the second and/or the third chamber. In particular, it can be provided that in the first chamber an atomizer is present, which is supplied with a nutrient solution. Thus, the first chamber can be filled with a nutrient-containing mist. In this embodiment, the apparatus according to the invention is suitable for an aeroponic cultivation of plants.

In one embodiment, the first and/or the second and/or the third chamber of an apparatus according to the invention includes an inlet and/or an outlet. Through the inlet or the feed line water, a nutrient solution, humid air rich in nutrients, nutrient mist or also fresh air can be introduced into the first chambers. Through the outlet or the discharge line, used water or used air can be discharged. Preferably, the first chamber includes an inlet and an outlet. In addition, it is possible that the second and/or the third chamber also has an inlet and/or outlet, so that it is not necessary to individually adjust the room climate at the apparatus, but to be able to guide air to a plurality of apparatuses according to the invention with a corresponding temperature and air humidity. Furthermore, these feed and discharge lines can serve for the aeration of the respective chambers.

In one embodiment, at least one side wall of the second chamber, preferably the left and right side wall of the second chamber, and possibly all four side walls of the second chamber is/are at least partly pivotable and/or shiftable and/or removable.

In one embodiment, the left and/or right side wall of the second chamber is a possibly elastic component with a rectangular base area, which is fixed at a lateral edge along the entire side length of the apparatus in the region of the first dividing plate and is fixed at the opposite lateral edge along the entire side length of the apparatus in the region of the second dividing plate. In one embodiment, the left and/or right side wall is shiftable or removable along the longitudinal direction of the component on a rail-like guide element.

By swiveling, shifting or removing one of the side walls or a plurality of side walls, the removal of the crops from the second chamber is facilitated.

In one embodiment, the left and the right side wall of the second chamber is at least partly pivotable and/or shiftable and/or removable. In this case, crops can be harvested in that a shield or a similar tool is driven through the second chamber from one side, so that the crops are pressed out from the second chamber on the other side. On the removal side of the crops, a conveyor belt or a collection tray can be present, which collects or takes away the crops. This process can easily be automated.

In a further embodiment, the apparatus according to the invention is formed as a modular cultivation unit. Such unit can be formed like a table, wherein the tabletop is formed by the apparatus according to the invention.

The apparatus according to the invention furthermore can include legs, coupling elements for various carrier elements and the like. Thus, the preferably modular units can be lifted, shifted, rolled away and be brought in position.

The invention furthermore relates to an apparatus for growing one or more plants, wherein the apparatus is formed as a modular unit. Preferably, the apparatus is formed according to one of the above-described embodiments. Due to the modular arrangement it can be achieved, among other things, that the spreading of bacteria or fungi from one apparatus to the next becomes difficult. A modular unit in accordance with the present invention preferably is designed such that it can manually or mechanically be moved by a user, so that in the case of a contamination with bacteria or the like it is replaceable or removable.

In one embodiment, each modular unit is supplied with water and/or nutrient solution separately or in parallel.

In a further aspect of the invention it is provided that the second chamber extends above and/or on one or both sides. It is conceivable, for example, that the second chamber is located both above and in a region on one or both sides beside the first chamber.

It is a further objective of the invention to provide a method which provides for an improved growing of plants and in particular crop-bearing useful plants.

In accordance with the invention, this objective is reached with a method according to claim 13. Advantageous embodiments can be taken from the sub-claims.

Accordingly, the invention relates to a method for growing one or more plants in an apparatus according to the invention, wherein the volume of the second chamber is increased.

The increase can be effected stepwise or steplessly, preferably by stepwise or stepless variation of the distance of the first and second dividing wall. The leaf-bearing tip of the stem axis always should be held on the other side of the second boundary surface and possibly in the third chamber. The crops should be produced in the second chamber which is increased in the course of the method. Alternatively, it is also conceivable that the volume is increased by increasing the distance of the lateral boundary surfaces.

In one embodiment, the method comprises the step of providing a germinable plant part in the first chamber of the apparatus directly below a connecting opening, possibly on a holding means described above in detail. When germinating, the roots of the young plant grow into the first chamber and the stem axis penetrates through a connecting opening and a corresponding exit opening.

In one embodiment, the room climate in the first and/or the second and/or the third chamber possibly is observed and/or controlled individually over at least a part and preferably over the entire course of the method.

This process can be automated particularly easily.

It is a further objective of the invention to provide a method which provides for an improved harvest of the crops of useful plants.

In accordance with the invention, this objective is reached with a method according to claim 15. Advantageous embodiments of the invention can be taken from the subclaims.

Accordingly, the invention relates to a method for harvesting the crops of one or more plants in an apparatus according to the invention, comprising the swiveling, shifting or removing of at least one side wall of the second chamber and the subsequent removal of the crops. Preferably, two opposed side walls and particularly preferably the left and the right side wall of the second chamber are at least partly swiveled and/or shifted and/or removed. Particularly preferably, the side walls are shifted along the longitudinal axis of the apparatus.

In one embodiment, a shield or a similar tool is driven through the second chamber from one side and the crops are pressed out on the other side. Possibly, the crops pressed out are collected on the removal side with a collection tray. Alternatively, the crops pressed out can be transported away on the removal side with a conveyor belt.

This process can be automated particularly easily.

In one embodiment, a bottom-side boundary surface of the first chamber is opened during or after harvesting. Thus, loosened roots can drop out from the first chamber. Alternatively, a sack or a cap which form part of the outer boundary of the first chamber can be removed or shifted off from the first chamber. Particularly preferably, the sack or the cap are shifted along the longitudinal axis of the apparatus.

In one embodiment, a shield or a shovel furthermore is guided to pass above the second boundary surface during the harvest. Thus, the loosened leaf canopy can be swept by the apparatus. Possibly, plant parts or substrate parts pressed out or falling out are collected with a collection tray or transported away with a conveyor belt.

Further details and advantages of the invention can be taken from the following exemplary embodiments.

In the Figures:

FIGS. 1a to 1e: show various views of a first embodiment of an apparatus according to the invention, FIG. 2: shows a perspective section through a further embodiment of an apparatus according to the invention, FIGS. 3a to 3d: show various views of a further embodiment of an apparatus according to the invention, FIGS. 4a to 4d: show various views of a further embodiment of an apparatus according to the invention, FIGS. 5a to 5d: show various views of a further embodiment of an apparatus according to the invention, FIG. 6: shows a perspective section through the further embodiment of an apparatus according to the invention as shown in FIGS. 5a to 5d, FIGS. 7a and 7b: show a possible arrangement of a plurality of apparatuses according to the invention, FIG. 8: shows a further possible arrangement of a plurality of apparatuses according to the invention, FIG. 9: shows different views of a further embodiment of the apparatus according to the invention, FIG. 10: shows different views of a further embodiment of the apparatus according to the invention with a second chamber which extends above and on both sides of the first chamber, and FIG. 11: shows various views of a further embodiment of the apparatus according to the invention, in which the first chamber is designed smaller than in the embodiment as shown in FIG. 10.

FIG. 1a shows a perspective view of a first embodiment of an apparatus 1 according to the invention. FIG. 1b shows the same embodiment seen from the side. FIG. 1c shows the same embodiment from the front. FIG. 1d shows the same embodiment from above. FIG. 1e shows a cross-section through the same embodiment at the sectional plane designated with the letter D in FIG. 1d.

The apparatus as shown in FIG. 1 includes a first chamber 10 and a second chamber 20.

Between the first chamber 10 and the second chamber 20 a first dividing wall 15 is located. Above the second chamber 20 a second dividing wall 25 is located.

The first chamber is defined by the first dividing wall as covering surface, by the left lateral boundary surface 11, the right lateral boundary surface 12, the front boundary surface 13, the rear boundary surface 14 and by the bottom surface 10a. The first chamber is fully defined by stable walls. The same can be fabricated for example from metal or a rigid plastic material.

The second chamber is defined by the second dividing wall as covering surface, by the first dividing wall as bottom, by the left lateral boundary surface 21, the right lateral boundary surface 22, the front boundary surface 23 and the rear boundary surface 24.

Inside the first dividing wall, connecting openings 16 are located, which connect the inner spaces of the first chamber 10 and the second chamber 20 with each other. Inside the second dividing wall 25, exit openings 26 are located, which connect the second chamber with the surroundings above the apparatus.

Both the first chamber and the second chamber are designed flat. The first dividing wall 15 and the second dividing wall 25 are arranged parallel to each other.

The apparatus includes a plurality of connecting openings 16 and exit openings 26, wherein the total number of connecting openings and exit openings corresponds to each other. To each connecting opening 16 an exit opening 26 is associated, which are aligned with each other.

On the connecting openings 16, means 17 for fixing a seed or seedling are mounted. On the exit openings 26, means 27 for guiding the stem axis are mounted.

The apparatus includes a feed line 41 and a discharge line 42. Through the feed line, water or a nutrient solution can be introduced into the first chamber 10. Used water or used nutrient solution leave the first chamber 10 through the discharge line 42. The first chamber 10 preferably is filled with an inorganic substrate, for example with grainy, granulated expanded clay. The apparatus in the embodiment shown in FIG. 1 is suitable in particular for cultivating the plants as hydroculture.

In the Figure a multitude of plants 5 are shown. The roots 6 of these plants are located inside the first chamber 10, a portion of the stem axis along with the crops 7 is located in the second chamber 20, and the leaf canopy is located above the apparatus. The stem axis, which extends from the roots 6 over the crops 7 to the leaf canopy 8, passes through a connecting opening 16 and an exit opening 26, wherein the respective openings are aligned with each other.

During cultivation, a germinable plant part is mounted on a fixing means 17 in the region of a connecting opening 16. In this phase, the second dividing wall 25 is located very close to the first dividing wall 15, so that the funnel-shaped means for guiding the stem axis 27 virtually rest against the connecting openings 16. The sprouting shoot penetrates through a connecting opening 16 and at the same time also through an exit opening 26. In the first chamber 10, the developing roots 6 are supplied with the necessary nutrients.

When the seedling 5 has reached a certain size and the leaf crown 8 has a sufficient protrusion beyond the second dividing wall 25, this second dividing wall is lifted and thus the volume of the second chamber and the distance between the first dividing wall 15 and the second dividing wall 25 is increased. This can also be accomplished by the force of the plant.

In the second chamber 20, a portion is obtained along the stem axis, which is separated both from the roots and from the leaf crown. At this portion, the crops will be formed later on. The climate and the air humidity inside the second chamber are influenced by the sprinkler system 45, in order to ensure an optimum growth of the crops.

The apparatus furthermore includes a rack 50, which has four legs 51. The apparatus is formed as a table-shaped, modular cultivation unit, wherein the chambers and dividing plates form the tabletop.

FIG. 2 shows a perspective section through a further embodiment of an apparatus according to the invention.

The embodiment is similar to the embodiment described in connection with FIG. 1, and in this connection reference is made to the description given there.

In FIG. 2, the shape of the holding means 17 and the guiding means 27, which are attached to the connecting openings 16 and to the exit openings 26, can be seen particularly clearly. The holding means 17 has a claw-shaped design and protrudes into the first chamber 10. Due to the claw-shaped design, it is suitable for example for holding a sprouting potato. The guiding means has a funnel-shaped design and protrudes into the second chamber 20. The funnel tapers in direction of the exit opening 26.

Furthermore, it can clearly and distinctly be seen in FIG. 2 that the left lateral boundary surface 21 and the right lateral boundary surface 22 of the second chamber 20 are formed flexible, so that the same can be expanded when increasing the volume of the chamber 20 by increasing the distance between the first dividing plate 15 and the second dividing plate 25, and furthermore cover the entire gap between first dividing plate 15 and second dividing plate 25.

The lateral boundary surfaces 22 and 23 furthermore are latched with the dividing walls via rail-like fixtures 90 at the lateral edges of the first dividing wall 15 and the second dividing wall 25, so that the same can be shifted in longitudinal direction of the apparatus 1. Thus, the lateral boundary of the second chamber can at least partly be removed, if necessary.

During cultivation, a germinable plant part is mounted on a fixing means 17 in the region of a connecting opening 16. In this phase, the second dividing wall 25 is located very close to the first dividing wall 15, so that the funnel-shaped means for guiding the stem axis 27 virtually rest against the connecting openings 16. The sprouting shoot penetrates through a connecting opening 16 and at the same time also through an exit opening 26. This is promoted by the funnel-like design of the guiding means 27. In the first chamber 10, the developing roots 6 are supplied with the necessary nutrients.

When the seedling 5 has reached a certain size and the leaf crown 8 has a sufficient protrusion beyond the second dividing wall 25, this second dividing wall is lifted and thus the volume of the second chamber and the distance between the first dividing wall 15 and the second dividing wall 25 is increased. This can also be accomplished by the force of the plant.

In the second chamber 20, a portion is obtained along the stem axis, which is separated both from the roots and from the leaf crown. At this portion, the crops will be formed later on. The climate and the air humidity inside the second chamber are influenced by the sprinkler system 45, in order to ensure an optimum growth of the crops.

FIG. 3a shows a perspective view of a further embodiment of an apparatus 1 according to the invention. FIG. 3b shows the same embodiment seen from the side. FIG. 3c shows the same embodiment from the front. FIG. 3d shows the same embodiment from above.

The embodiment is similar to the embodiment described in connection with FIG. 1, and in this connection reference is made to the description given there.

FIG. 3c particularly clearly shows that the left lateral boundary surface 21 and the right lateral boundary surface 22 of the second chamber 20 are formed flexible. Due to a gap between the first dividing plate 15 and the second dividing plate 25 and the resulting increase in volume of the second chamber 20, the same have been expanded already. The plants 5 shown in FIG. 3 already are more grown-up than the plants shown in FIG. 1.

In contrast to the embodiment shown in FIG. 1, the embodiment shown in FIG. 3 includes a third chamber 30 which is covered by a transparent hood 31. The exit openings 26 thus connect the second chamber 20 with the third chamber 30. The leaf crown 8 of the plants 5 is located inside the third chamber 30.

The apparatus according to the invention in accordance with the embodiment of FIG. 3 represents a miniature greenhouse, wherein all parts of the plant 5 are located in a possibly air-conditioned zone separated from the surroundings.

Through the transparent hood 31 the crown 8 of the plants is irradiated with sunlight from outside.

Beside the feet 51, the rack 50 of the apparatus according to the embodiment of FIG. 3 furthermore comprises skids 52 with which the apparatus can easily be shifted, if necessary, on a corresponding guiding system.

FIG. 4 again shows the embodiment depicted in FIG. 3 with the lid cap 31 removed.

FIG. 4a shows a perspective view of a further embodiment of an apparatus 1 according to the invention. FIG. 4b shows the same embodiment seen from the side. FIG. 4c shows the same embodiment from the front. FIG. 4d shows the same embodiment from above.

Due to the removal of the lid cap 31, the third chamber 30 no longer exists and the leaf canopy of the plant is located out in the open, comparable to the embodiment shown in FIG. 1.

Furthermore, FIG. 4 shows a harvesting system which is composed of a transport means 60 and a shifting means 70.

The conveying means 60 includes two conveyor belts 62 and 63. The conveyor belt 62 is running laterally along the apparatus according to the invention at a height slightly below the level of the first dividing wall 15. It directly rests against the apparatus or extends at an only small distance to the same. The conveyor belt 63 extends congruent with the conveyor belt 62 and above the conveyor belt 62. It is likewise running laterally along the apparatus according to the invention and directly rests against the apparatus or extends at an only small distance to the same. The conveyor belt 63 extends slightly below the level of the second dividing wall 25.

Of course, it is conceivable that also only the first conveyor belt or the second conveyor belt is present.

In the Figure, the ramps 18 and 28 furthermore are shown. The ramp 18 directly adjoins the longitudinal edge of the first dividing wall 15 and extends away from the apparatus 1 obliquely inclined downwards from this edge. This ramp can be a separate component, belong to the conveying means 60, or be present at the apparatus according to the invention.

If the ramp 18 is a separate component, or if the ramp 18 belongs to the conveying means 60, it is possible that a means for mounting a ramp is provided on the apparatus according to the invention at the level of the first dividing wall 15.

In one embodiment, the ramp 18 also can be a part of the lateral boundary surface 22 folded to the outside.

The shifting means 70 comprises a pair of slides 71, which are arranged at the level of the second chamber, and a further pair of slides 72, which are arranged above the level of the second dividing wall 25.

All slides comprise a hydraulic system which can push the tools mounted on the slides into the region of the apparatus according to the invention.

On the first pair of slides 71 a shield 75 is mounted, which is guided through the second chamber, wherein the crops are pressed out on the other side of the second chamber. On the opposite side, the crops stripped off are guided over the ramp 18 onto the conveyor belt 62 and transported away along the longitudinal axis of the apparatus according to the invention.

On the second pair of slides 72 a shovel 76 is mounted. By extending the slides 72, the shovel 73 can be guided horizontally to pass slightly above the second dividing wall 25, wherein the upper part of the stem axis as well as the leaf crown of the plants are touched by the apparatus. On the opposite side, the leaf crowns of the useful plants stripped off are guided over the ramp 28 onto the conveyor belt 63 and transported away along the longitudinal axis of the apparatus according to the invention. At the front lower edge 77 of the shovel 76 a sharp edge, a knife or a saw-like formation possibly is present, which promotes the cutting of the stem axis.

This process can excellently be automated. The apparatus according to the invention thus is particularly useful for the large-scale industrial cultivation.

During the harvest described in connection with FIG. 4, the left and right lateral boundary walls 21 and 22 of the second chamber 20 must also be opened beside the covering cap 31.

A particularly advantageous shifting mechanism has been explained already in connection with FIG. 2. Particularly preferably, the left and right side walls 21 and 22 are shifted away in longitudinal direction of the apparatus. Shifting away is particularly advantageous, since this operation can best be automated.

FIG. 5 shows a further embodiment of an apparatus according to the invention.

FIG. 5a shows a perspective view of this embodiment. FIG. 5b shows the same embodiment seen from the side. FIG. 5c shows the same embodiment from the front. FIG. 5d shows the same embodiment from above.

In this embodiment, the second chamber 20 is approximately channel-shaped, and the width extension is small as compared to the longitudinal extension. The first dividing wall 15 and the second dividing wall 25 each include a plurality of through openings 16 or exit openings 26, which are arranged in one line along the longitudinal axis of the apparatus.

With an arrow H directed vertically upwards and downwards, the variability of the height of the second boundary surface is indicated in FIGS. 5a and 5c, wherein the volume of the second chamber 20 can be increased, so as to create more space for the crops 7.

In the embodiment shown in FIG. 5, the lower boundary of the first chamber 10 is a flexible plastic sack 10b impermeable to water. The same is mounted on fixing means on the left and right side walls 11 and 12 of the first chamber 10. When harvesting, this sack can be removed by separating a connection or be stripped off in longitudinal direction similar to the lateral boundary walls 21 of the second chamber. For this purpose, the sack 10a can be latched at the lower lateral edges of the left and right side walls 11 and 12 of the first chamber 10 via rail-like fixtures, so that the same can be shifted in longitudinal direction of the apparatus.

If the leaf canopy and the fruit-bearing part of the plant are removed during a harvest, the roots of the plant initially remain in the first chamber and must likewise be removed. In the embodiment shown in FIG. 4, the roots 6 can drop into the sack 13 and thus be collected and transported away in a simple way.

In the case of the use of a water-tight sack 10a an aeroponic plant breeding is particularly advantageous, since the same is not impaired by the comparatively large volume of the first chamber. For this purpose, nebulizers 46 are present in the first chamber, which by supplying a nutrient solution generate a mist rich in nutrients in the first chamber.

FIG. 6 shows a perspective partial view of a cross-section through an embodiment of an apparatus according to the invention as shown in FIG. 5. In this connection, reference is made to the description of FIG. 5.

In this Figure, in particular the rail-like fixtures 95 at the lower lateral edges of the left and right side walls 11 and 12 of the first chamber 10 are clearly shown, with which the sack 10a can be latched, so that the same can be shifted in longitudinal direction of the apparatus.

FIGS. 7a and 7b show two perspective views of a plant breeding facility with a plurality of apparatuses 1 according to the invention, which are aligned along a grid. The apparatuses 1 each are arranged above a pair of rails 100, which provides for the automated access to a number of objects and machines. For example, a tray 110 can automatically be moved under the apparatus according to the invention, so that when opening the lower boundary wall 10a, 10b of the first chamber 10 an escaping substrate, an escaping nutrient solution and possibly the roots can be collected during a harvest and be transported away. This process likewise can easily be automated.

Furthermore, a lifting cart 120 can be moved in below the unit, which can be latched with the apparatus according to the invention at a suitable point of the rack. Thus, it is possible to automatically shift an apparatus according to the invention along the rails 100.

FIG. 8 shows a perspective arrangement of a plurality of apparatuses 1 according to the invention in accordance with the embodiment shown in FIG. 2, wherein the same stand in the open field as miniature greenhouses. Via the skids 52, these apparatuses 1 are distributed over a field along rails 130, in order to ensure a good utilization of space and to be able to substantially simplify or automate the erection or removal. Furthermore, it can be provided that a conveying mechanism is provided in the depressions 130, by means of which the apparatuses 1 according to the invention can automatically be shifted along the depressions 130.

FIG. 9 shows different views of a further configuration of the apparatus in accordance with the present invention.

From the cross-sectional view according to FIG. 9a, the basic construction of the apparatus can be seen. Above the first chamber 10 for receiving the roots, there is located the second chamber 20 for receiving the crops, for example potatoes, tomatoes or the like.

Reference numeral 25 designates the second dividing wall, which delimits the second chamber towards the top. In this second dividing wall, exit openings are located, through which the stalk of the plants protrudes, so that the leaves are located above the second chamber 20 and hence also above the second dividing wall 25.

The reference numerals 22, 23 designate the lateral boundary walls of the second dividing wall.

These lateral walls can be designed to be adjustable in their height and be made of a flexible material.

Reference numeral 45 designates a sprinkler system, through which for example air humidity or nutrients can be introduced into the second chamber 20, in order to ensure an optimum growth of the crops.

As can be taken from FIG. 9a, this sprinkler system is located in longitudinal direction of the apparatus and in an upper corner region of the second chamber 20.

Reference numeral 15 designates the first dividing wall, which separates the first chamber 10 from the second chamber. In this first dividing wall 15, there are also located openings for receiving holding means, by means of which the seedlings or seeds are fixed.

Below these holding means, the roots of the plant are located in the first chamber 10.

Reference numeral 10a designates the bottom wall of the first chamber 10.

As has already been stated above, it is conceivable that a nutrient solution, preferably an aqueous nutrient solution, is present in the channel 10a, or that such a solution flows through the channel 10a, in order to supply sufficient nutrients and/or also air to the roots, if this is necessary.

FIG. 9b shows the arrangement according to FIG. 9a in a top view, wherein here again reference numeral 26 designates the openings arranged in the upper dividing wall 25, through which the stem axis 27 extends from the second chamber 20 to the outside.

FIG. 9c shows the arrangement according to FIG. 9a in a side view, and FIG. 9d shows the arrangement according to FIG. 9a in a perspective view in which it is again illustrated that the two chambers 10, 20 lie one on top of the other.

This arrangement only is an example which does not limit the invention.

As can be taken from FIG. 10, it is also conceivable that the second chamber 20 not only extends above the first chamber 10, but also in one or in both lateral regions of the first chamber 10. FIG. 10a again shows the first chamber 10 for receiving the roots of the plant. In the exemplary embodiment of FIG. 10a, this chamber 10 in principle is sack-shaped and can consist of firm or flexible walls. In contrast to the embodiment according to FIG. 9, the second chamber 20 not only extends above the first chamber 10, but also in both side regions of the chamber 10, as can be taken from FIG. 10a. Thus, the second chamber 20 forms an inverted U-shaped arrangement and hence extends both above and on both sides of the first chamber 10.

This has the advantage that the volume of the second chamber 20 is increased as compared to the exemplary embodiment of FIG. 9, so that more space is provided for increasing the corresponding region of the plant, which is located in the second chamber 20.

As indicated by double arrows, it can be provided that both the first dividing wall 15 and the second dividing wall 25 is variable in its height, so that the volume of the first chamber 10 and/or of the second chamber 20 is variably adjustable by a corresponding height adjustment. Like also in the exemplary embodiment of FIG. 9, it can be provided that one or more openings for receiving the stem axis or the stalk of the plant extend in the second dividing plate 25.

In the exemplary embodiment of FIG. 10, the reference numeral 45 also designates channels through which an irrigation or sprinkling of the corresponding chambers or the part of the plant present therein is possible. Through these channels, for example a liquid, air, a nutrient solution or the like can be guided into the first or into the second chamber.

Figure 1A:
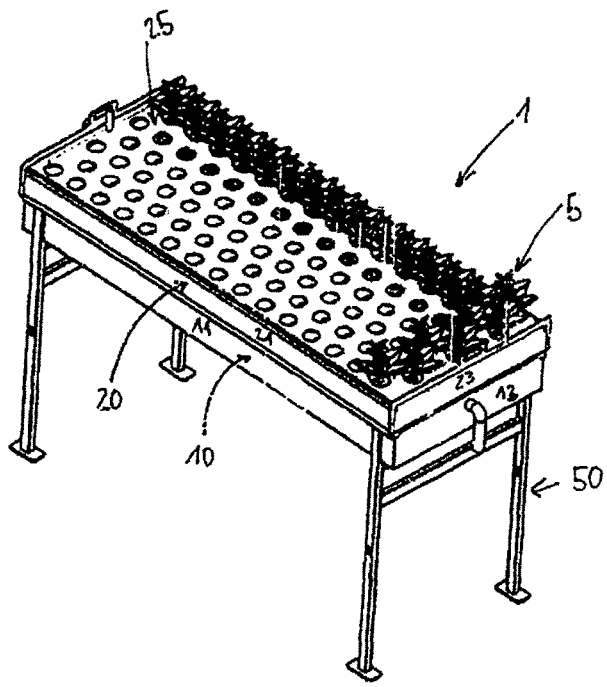
Figure 1B:
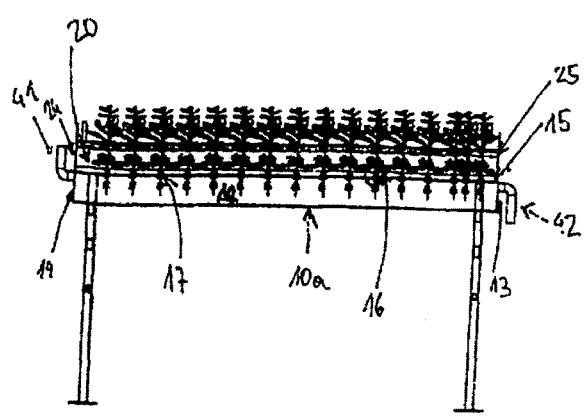
Figure 1C:
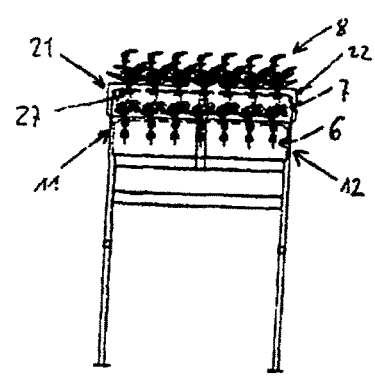
Figure 3A:
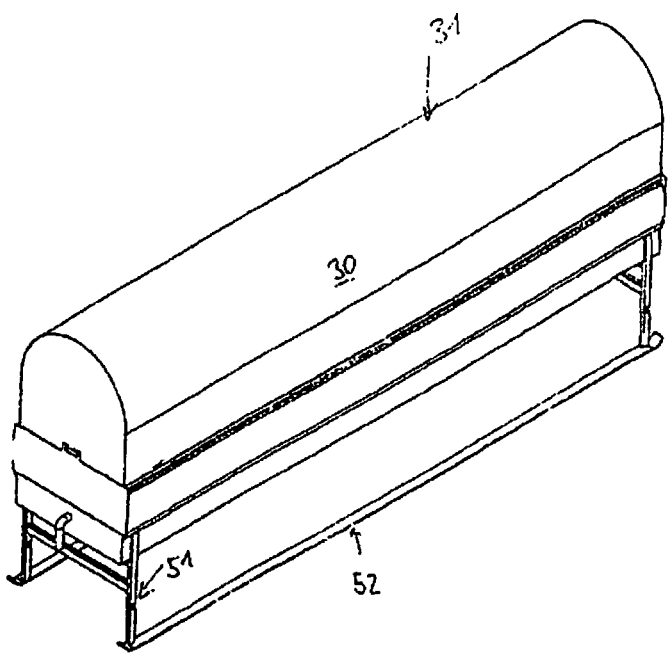
Figure 3B:
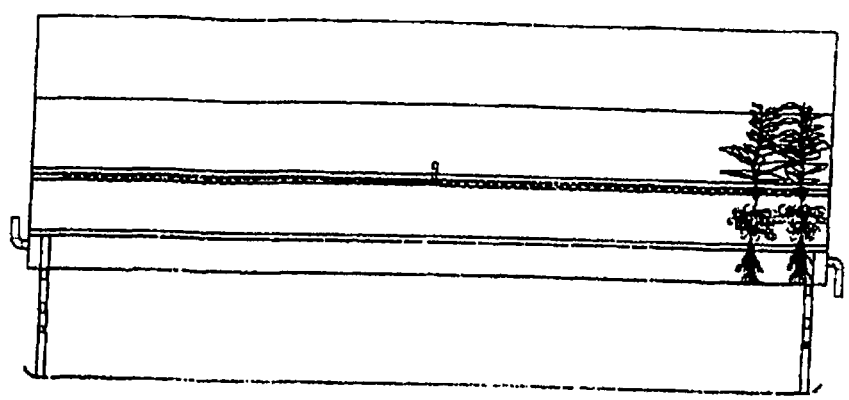
Figure 3C:
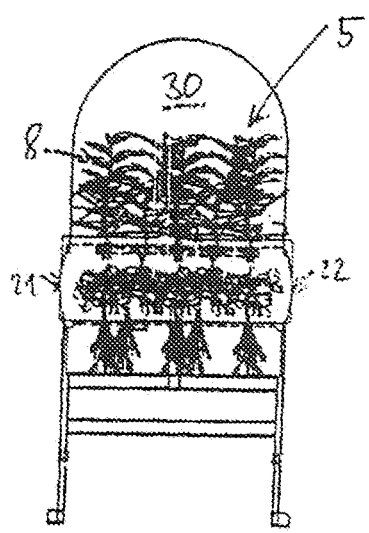
Figure 3D:
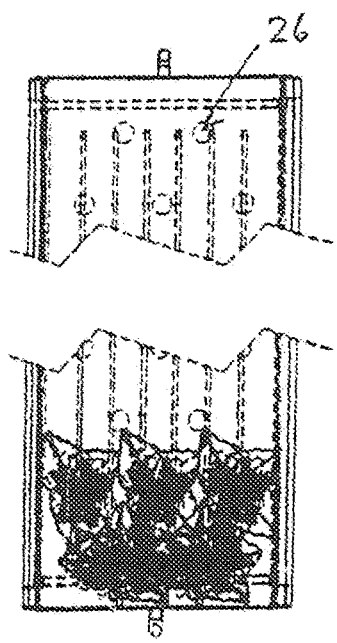
Figure 4A:
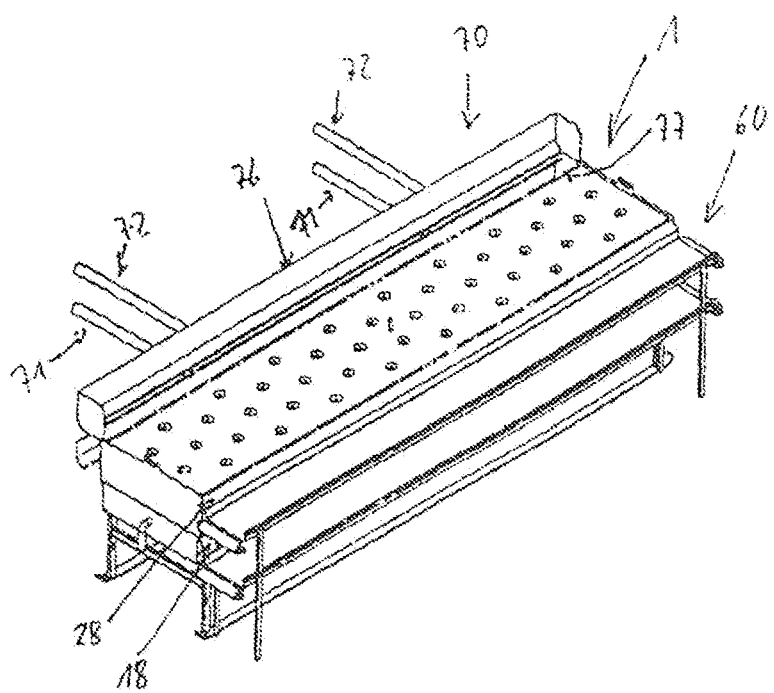
Figure 4B:
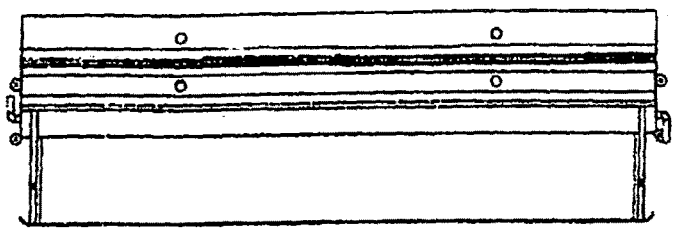
Figure 4C:
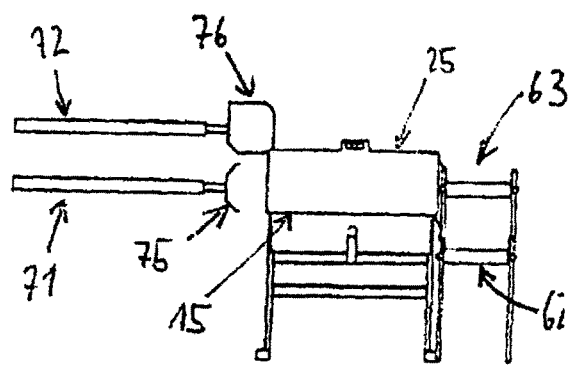
Figure 4D:
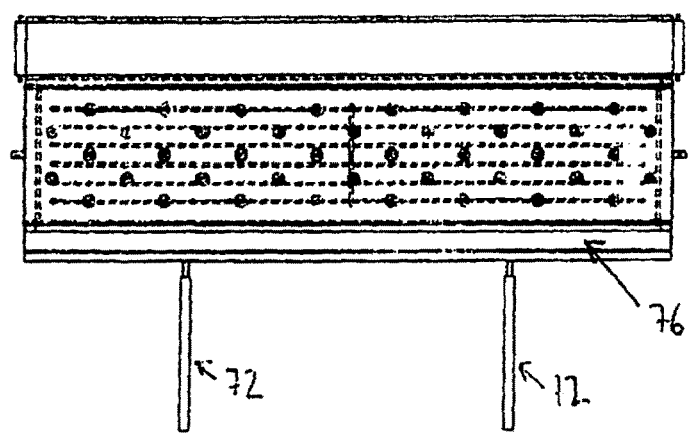
Figure 5A:
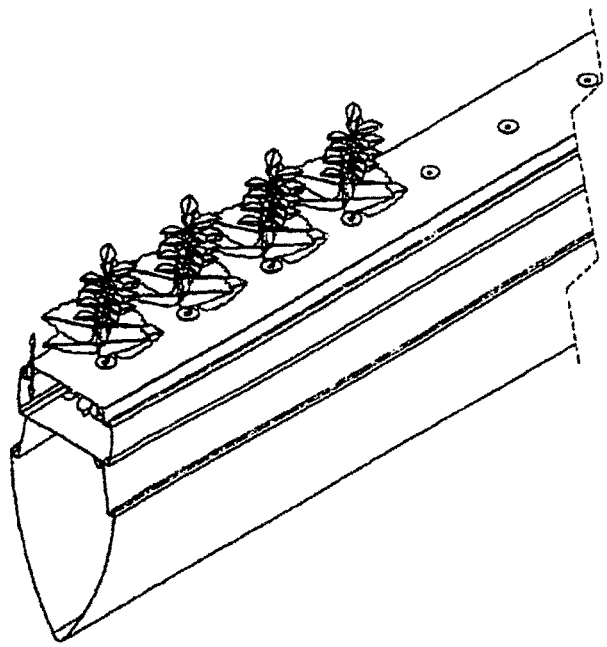
Figure 5B:
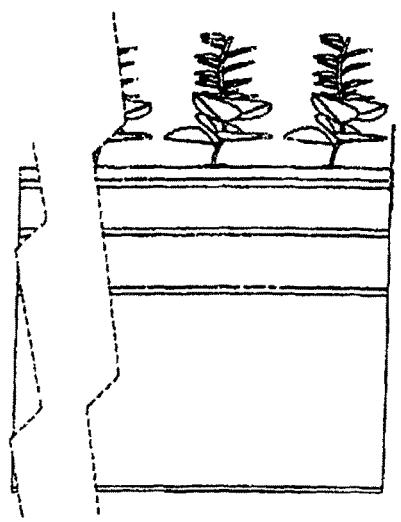
Figure 5C:
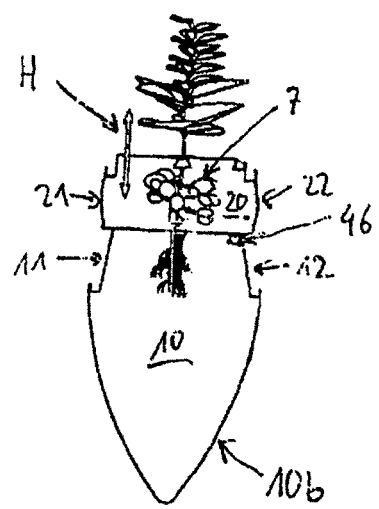
Figure 5D:
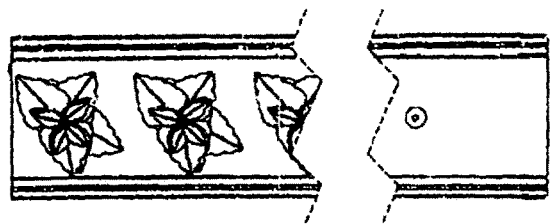
Figure 6:
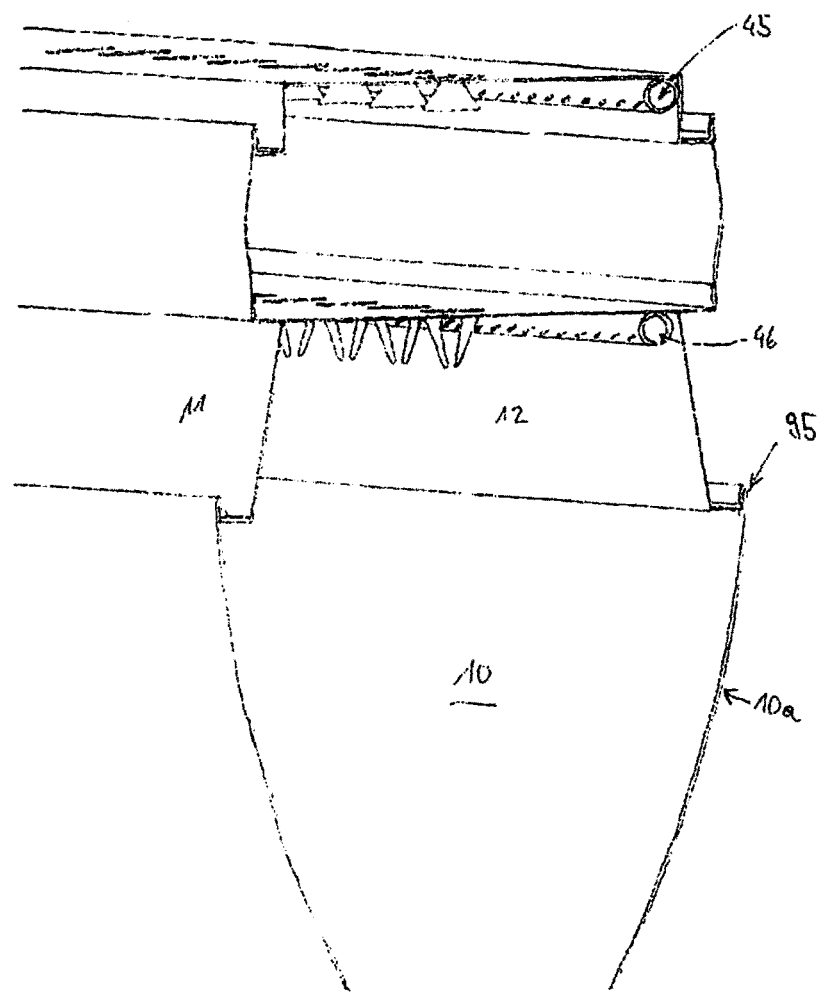
Figure 7A:
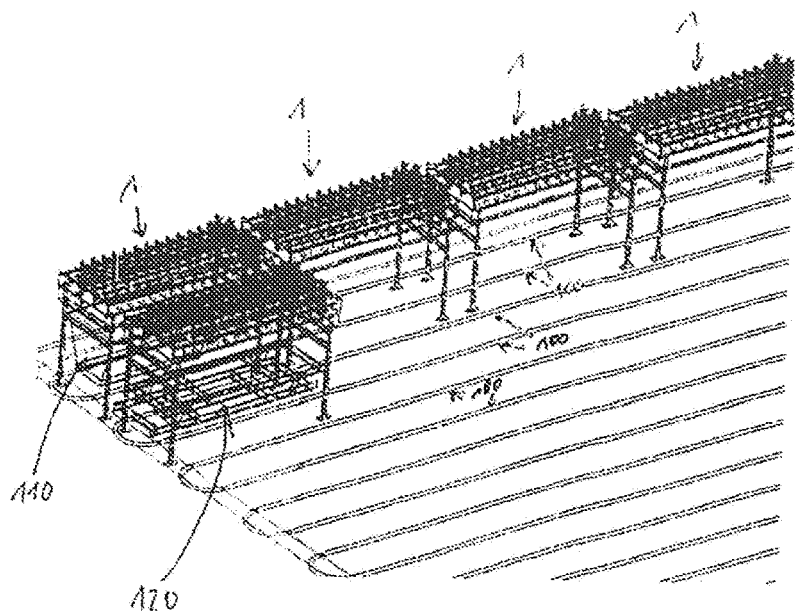
Figure 7B:
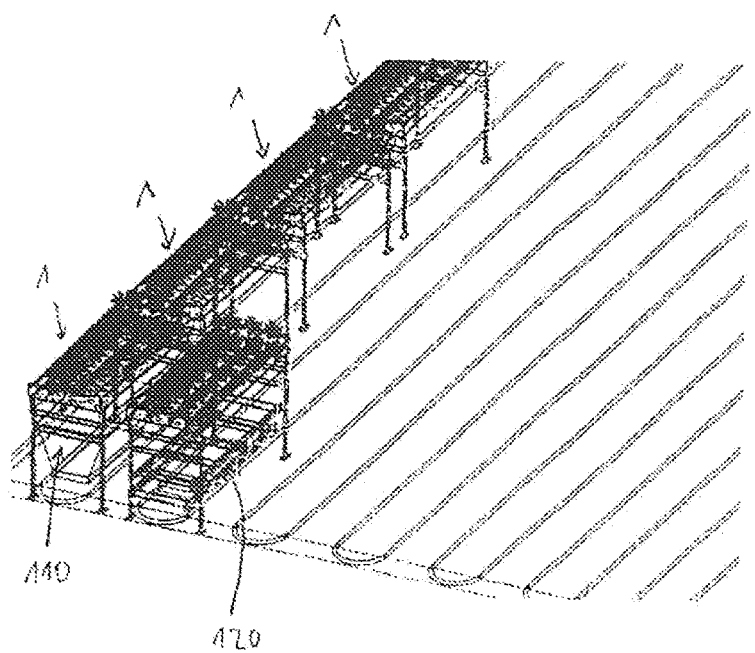
Figure 8:
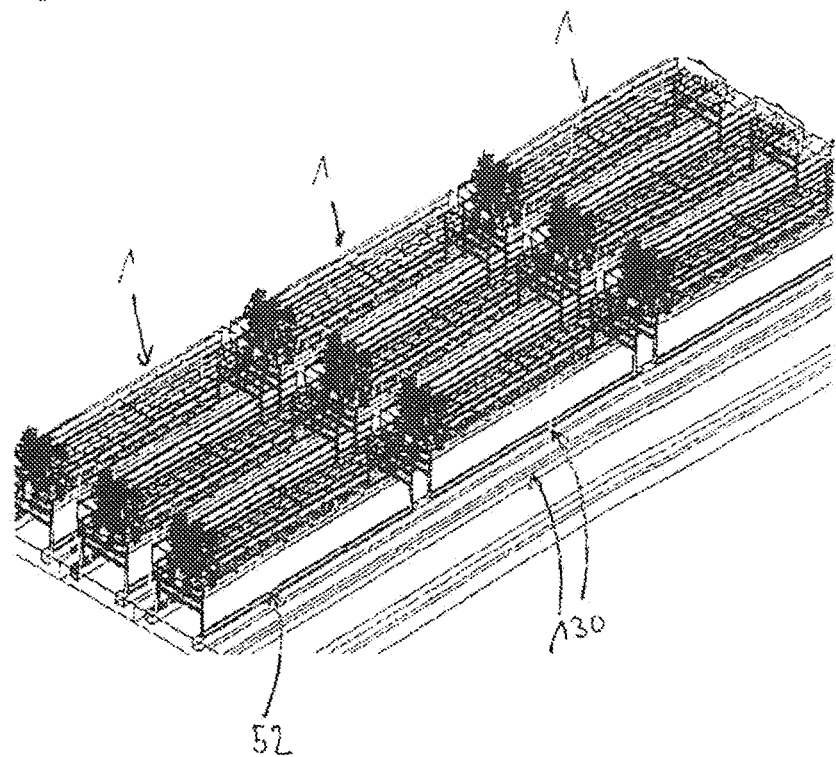
Figure 9A:
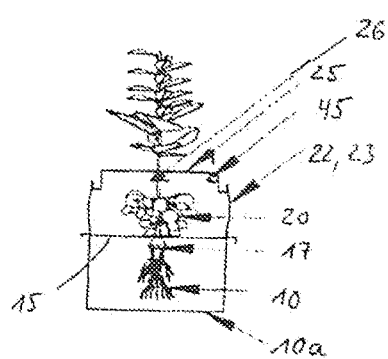
Figure 9B:
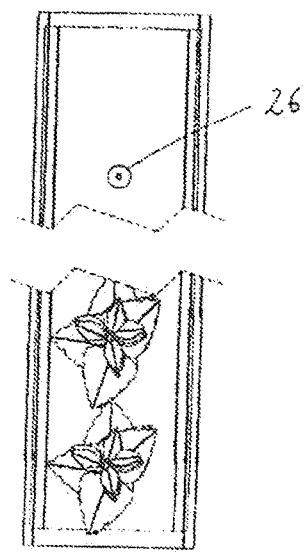
Figure 9C:
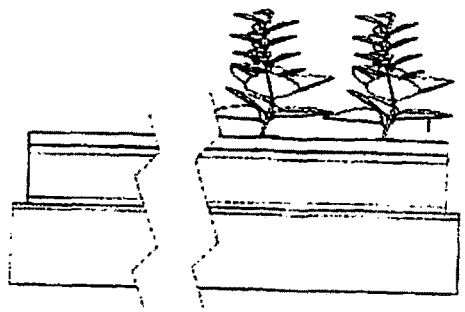
Figure 9D:
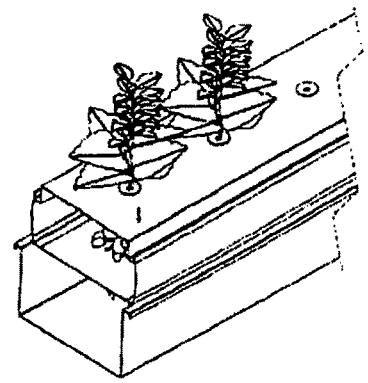
Figure 10A:
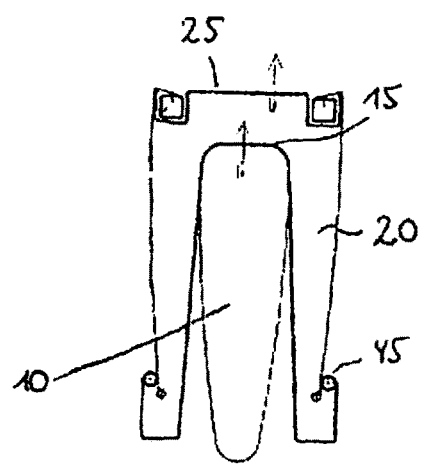
FIG. 10b shows the arrangement according to FIG. 10a in a top view.
FIG. 10c shows the arrangement according to FIG. 10a in a side view.
FIG. 10d shows the arrangement according to FIG. 10a in a perspective view.
Figure 10B:
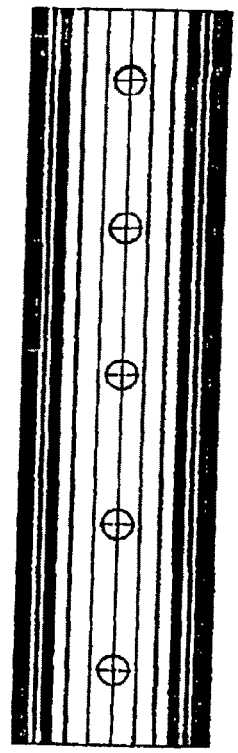
Figure 10C:
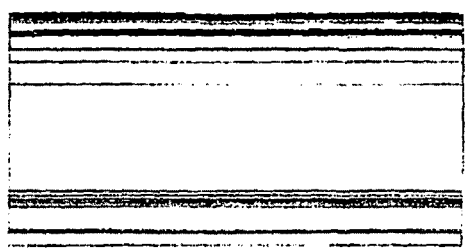
Figure 10D:
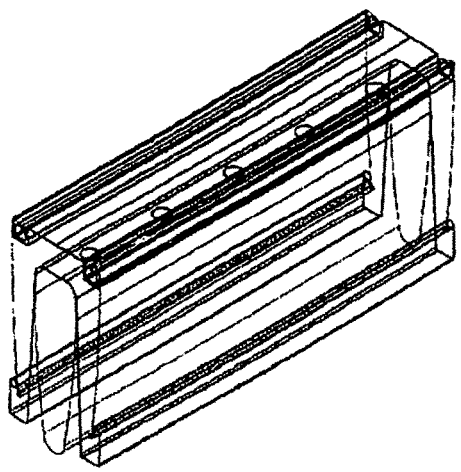

In the exemplary embodiment according to FIG. 11, the first dividing plate 15 and the second dividing plate 25 also are height-adjustable, so that a change in volume of the first chamber 10 and also of the second chamber 20 is conceivable.

Alternatively or in addition it can also be provided that the bottom plate 10a of the first chamber is designed variable in height, so that the volume of the first chamber 10 is variable independent of the volume of the second chamber.

With regard to the further features and configurations of the exemplary embodiment, reference is made to the explanations of FIG. 10.

Figure 11A:
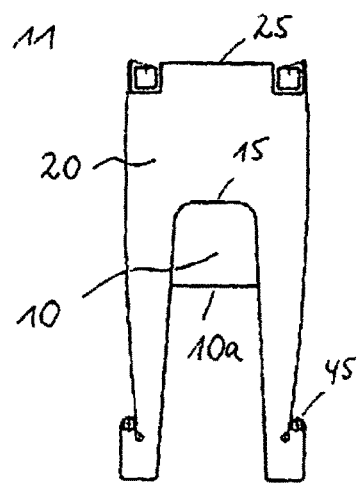
FIG. 11 shows a further embodiment which is similar to the one shown in FIG. 10. As a difference it should be mentioned that the first chamber 10 is delimited by a lower horizontal dividing wall and hence on the whole has a smaller volume than the first chamber 10 according to FIG. 10.
Figure 11B:
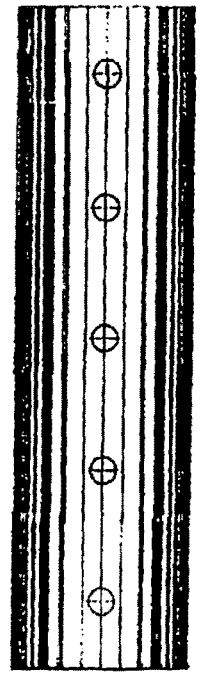
Figure 11C:
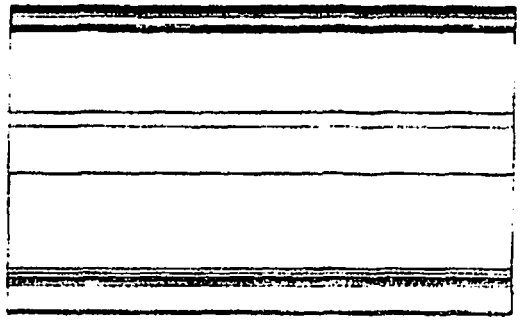
Figure 11D:
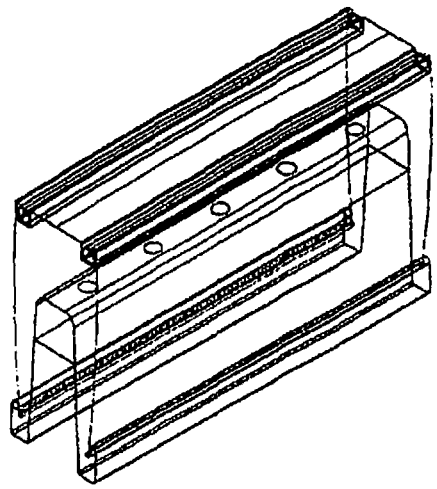

FIG. 11b shows the arrangement according to FIG. 11a in a top view, FIG. 11c shows the arrangement according to FIG. 11a in a side view, and FIG. 11d shows the arrangement according to FIG. 11a in a perspective view.

With an apparatus according to the invention, the cultivation can be carried out in an automated manner particularly simply and easily and leads to improved yields as compared to apparatuses according to the prior art. In addition, the apparatus according to the invention provides for an ease of harvesting, in that the crops of the plant lie inside the second chamber of the apparatus according to the invention substantially separate from the root and the leaf canopy.

The invention claimed is:
1. An apparatus for growing plants comprising:
a root chamber and a crop chamber, the crop chamber being located above the root chamber;
a first dividing wall which forms a lower boundary of the crop chamber and separates the root chamber from the crop chamber;

a second dividing wall which forms an upper boundary of the crop chamber and which is disposed above the first dividing wall; and lateral boundary surfaces of the crop chamber which connect the first dividing wall and the second dividing wall, wherein the crop chamber is defined by the second dividing wall as a covering surface, by the first dividing wall as a bottom, by a left lateral boundary surface and a right lateral boundary surface;

wherein the root chamber defines an interior space dimensioned and configured to accommodate roots of a number of plants;

the crop chamber defining an interior space dimensioned and configured to accommodate crops of the plants;

the interior spaces of the root chamber and the crop chamber are connected by connecting openings in the first dividing wall;

the second dividing wall including exit openings which are configured to receive stems of the plants and allow leaf canopies of the plants to reside above the crop chamber;

at least one of the boundary surfaces of the crop chamber is pivotable or removable;

the second dividing wall is movable relative to the first dividing wall in a vertical direction such that the volume of the crop chamber is variable;

the lateral boundary surfaces are latched with the dividing walls via rail-like fixtures at lateral edges of the first dividing wall and the second dividing wall;

the root chamber including a left wall, an oppositely disposed right wall, and a sack which attaches to the left wall and the right wall, wherein the left wall and the right wall extend downwardly from the first dividing wall, the left wall incorporating a rail-like guide for receiving a first portion of the sack, and the right wall incorporating a rail-like guide for receiving a second portion of the sack.

2. The apparatus according to claim 1, wherein the root chamber defines a volume and the crop chamber defines a volume and the volume of the root chamber is variable, the volume of the crop chamber is variable, or the volume of the root chamber and the volume of the crop chamber are both variable.

3. The apparatus according to claim 2, wherein the volume of the root chamber is variable by varying the position of the first dividing wall.

4. The apparatus according to claim 2, wherein the volume of the crop chamber is variable by varying the position of the first dividing wall relative to the position of the second dividing wall or varying the position of the second dividing wall relative to the position of the first dividing wall.

5. The apparatus according to claim 1, wherein the at least one lateral boundary surface of the crop chamber, which connects the first dividing wall and the second dividing wall with each other, is flexible.

6. The apparatus according to claim 1, wherein an equal number of connecting openings and exit openings are present.

7. The apparatus according to claim 1, wherein all boundary surfaces of the root chamber are substantially rigid.

8. The apparatus according to claim 1, wherein the root chamber includes at least one inlet, at least one outlet, or at least one inlet and at least one outlet.

9. The apparatus according to claim 1, wherein the root chamber contains a substrate for plant growth.

10. The apparatus according to claim 9, wherein a fluid medium is present in the root chamber.

11. The apparatus according to claim 1, wherein the apparatus is formed as modular unit.

12. The apparatus according to claim 1, wherein the crop chamber extends in a region on one side or on both sides of the root chamber.

13. The apparatus according to claim 1, wherein the crop chamber has two lateral boundary surfaces.

14. The apparatus according to claim 1, wherein one pair of connecting openings and exit openings is in alignment.

15. The apparatus according to claim 1, wherein the sack is watertight.

16. The apparatus according to claim 1, wherein the rail-like guides are dimensioned and configured to allow the sack to be shiftable or removable.

17. A method for growing one or more plants in an apparatus according to claim 1, comprising providing the apparatus of claim 1 and implementing a stepwise or stepless increase of the volume of the crop chamber.

18. The method according to claim 17, wherein the increase of the volume of the crop chamber is effected by increasing the distance between the first and the second dividing wall.

19. A method for harvesting the crops of one or more plants in an apparatus according to claim 1, comprising providing the apparatus of claim 1, causing at least partial swiveling, shifting or removing of at least one boundary surface of the crop chamber, and removing crops from the crop chamber.

20. The method according to claim 19, wherein two opposed side walls are at least partly swiveled and/or shifted and/or removed and a shield or a shovel is driven through the crop chamber from one side and the crops are pressed out on the other side.

* * * * *